United States Patent [19]

Torgrimsen

[11] Patent Number: 5,603,381
[45] Date of Patent: Feb. 18, 1997

[54] MULTI-SHARE PLOUGH

[75] Inventor: Tor Torgrimsen, Stavanger, Norway

[73] Assignee: Kverneland Klepp AS, Kverneland, Norway

[21] Appl. No.: 362,540

[22] PCT Filed: May 3, 1994

[86] PCT No.: PCT/GB94/00945

§ 371 Date: Feb. 16, 1995

§ 102(e) Date: Feb. 16, 1995

[87] PCT Pub. No.: WO94/24842

PCT Pub. Date: Nov. 10, 1994

[30] Foreign Application Priority Data

May 4, 1993 [GB] United Kingdom .................... 9309166

[51] Int. Cl.$^6$ ................ A01B 3/46; A01B 15/14
[52] U.S. Cl. ............................. 172/219; 172/225
[58] Field of Search ................. 172/4, 218, 219, 172/212, 223, 260.5, 225, 452, 457, 459, 460

[56] References Cited

U.S. PATENT DOCUMENTS

| | | | |
|---|---|---|---|
| 4,648,466 | 3/1987 | Baker et al. | 172/260.5 |
| 5,065,681 | 11/1991 | Hadley . | |
| 5,277,257 | 1/1994 | Thompson et al. | 172/4 |
| 5,314,028 | 5/1994 | Mong | 172/219 |
| 5,339,906 | 8/1994 | Fox et al. | 172/4 |
| 5,381,866 | 1/1995 | Mong | 172/219 |

FOREIGN PATENT DOCUMENTS

| | | |
|---|---|---|
| 297969 | 1/1989 | European Pat. Off. . |
| 2201022 | 4/1974 | France . |
| 9205779 | 7/1992 | Germany . |
| 9302221 | 4/1993 | Germany . |

Primary Examiner—Terry Lee Melius
Assistant Examiner—Robert Pezzuto
Attorney, Agent, or Firm—Workman, Nydegger & Seeley

[57] ABSTRACT

There is disclosed a semi-mountable plough comprising an elongate plough frame having a long forward frame section (1) carrying a plurality of plough bodies (2), a short intermediate section (3) pivotally connected to the rear end of the forward section (1), and a rear frame section (5) pivotally connected at its forward end to the rear of the intermediate section (3), with the plough being of a reversible type and the sections (1, 3, and 5) being pivotable relative to each other in a generally horizontal plane to take up new positions suitable for movement of the plough in a reverse direction. The rear frame section (5) is pivotable about a horizontal pivot (11) so as to follow any unevenness in the ground, and an hydraulically operated actuator (18, 19, 12') is coupled with said rear frame section and is operative to urge the frame section to pivot downwardly about said horizontal pivot (ii) and thereby maintain the plough actuator and includes a pressure regulator (20) to control the hydraulic pressure supplied to the actuator (12, 19, 12') so that a controlled biasing force is applied to the rear frame section (5) which maintains the required ploughing depth of the plough bodies (21), but which can be overcome so as to allow pivoting movement of the rear frame section (5) in order to follow the contour of the ground which is being ploughed.

20 Claims, 4 Drawing Sheets

MULTI-SHARE PLOUGH

This invention relates to a multi-share plough and particularly, though not exclusively, to a semi-mountable plough of the reversible type, comprising an elongate plough frame carrying a plurality of plough bodies and being supported on wheel means, said elongate plough frame comprising a front plough frame section and a rear plough frame section, with the rear plough frame section being articulated directly to said front plough frame section or indirectly via an intermediate frame section.

In semi-mounted ploughs, the plough frame carries a large number of plough bodies, and therefore the plough frame has to be divided in order to constitute two mutually articulated frame sections, namely a front plough frame section and a rear plough frame section, and optionally with an intermediate frame section between the front and rear plough frame sections.

The purpose of such an articulated plough frame is to allow the plough to follow in a sufficient degree unevennesses and roughness of the ground.

Moreover, long semi-mounted ploughs have a support frame of such a longitudinal extent that the rear end portion possesses a tendency of being deflected resiliently.

When the ploughs become very long, the rearmost plough bodies will hang somewhat lower than the intermediate plough bodies. Therefore, this makes it difficult to control the rear portion.

This results in that the rearmost plough bodies—when the plough is placed into the soil at the beginning of each furrow—start to plough simultaneously with the foremost plough bodies. This results in the beginning of each furrow, as seen in a top plan view, after ploughing, showing a triangular area that has become ploughed and a triangular area that has not become ploughed.

With a twelve-share plough, a considerable area will receive such an uneven ploughing.

Normally, this area is ploughed laterally of the furrows in a final ploughing operation. When doing so, the soil becomes partly reversed back again within said triangular areas which already have been ploughed such that the soil which should have been the lowermost, comes uppermost again.

The result of all this is poor and uneven growth within said areas.

Attempts have been made to control the rear plough frame section through locking the link or pivot constituting the articulation between the front and rear plough frame sections or between the latter and an intermediate frame section, respectively, during the lifting and reversal of a semi-mounted reversible plough. Said link or pivot is released whenever the plough once more has taken the ploughing position.

However, such an arrangement does not represent a satisfactory solution.

In our UK patent application No 9203279.6 it is proposed to obviate the problems and difficulties associated with existing designs of multi-share ploughs of the kind concerned and, thus, provide a simple and efficient multi-share plough, preferably a semi-mounted reversible plough constructed and adapted in order to eliminate or substantially reduce the deficiencies and disadvantages of prior art multi-share ploughs having equivalent dimensions, thus giving rise to a much improved ploughing result.

According to the invention claimed in our aforesaid UK patent application there is provided a multi-share plough comprising an elongate plough frame having a forward frame section adapted to be connected at its leading end to the rear of a towing vehicle, a rear frame section pivotally connected at its forward end to the rear of the forward section so as to be capable of pivoting upwardly and downwardly relative to the forward section in order to follow unevennesses in the surface of the ground being ploughed, and a plurality of plough bodies mounted on said frame sections, in which an actuator is coupled with said rear frame section and is operable in a first mode to allow limited pivotal movement of the rear frame section and in a second mode to prevent such pivotal movement.

The present invention seeks to improve the multi-share plough disclosed and claimed in our aforesaid UK patent application, by providing improved depth control of the plough bodies, and especially (though not exclusively) when the number of plough bodies carried by the rear frame section is reduced and/or during heavy soil conditions such that otherwise ploughing by the rear end plough bodies may not be as deep as is required.

Accordingly, the present invention provides a multi-share plough comprising an elongate plough frame having a forward frame section adapted to be connected at its leading end to the rear of a towing vehicle, a rear frame section pivotally connected at its forward end to the rear of the forward section so as to be capable of pivoting upwardly and downwardly relative to the forward section in order to follow unevennesses in the surface of the ground being ploughed, and a plurality of plough bodies mounted on said frame sections, characterised in that an hydraulically operated actuator is coupled with said rear frame section and is operative to urge the frame section to pivot downwardly about said horizontal pivot and thereby maintain the plough bodies carried by the rear frame section at a required ploughing depth, and in that a hydraulic control circuit is connected to said actuator and includes a pressure regulator to control the hydraulic pressure supplied to the actuator so that a controlled biasing force is applied to the rear frame section which maintains the required ploughing depth of the plough bodies, but which can be overcome so as to allow pivoting movement of the rear frame section in order to follow the contour of the ground which is being ploughed.

An embodiment of multi-share plough according to the invention will now be described, by way of example only, with reference to the accompanying drawings, in which.

Figure 1:
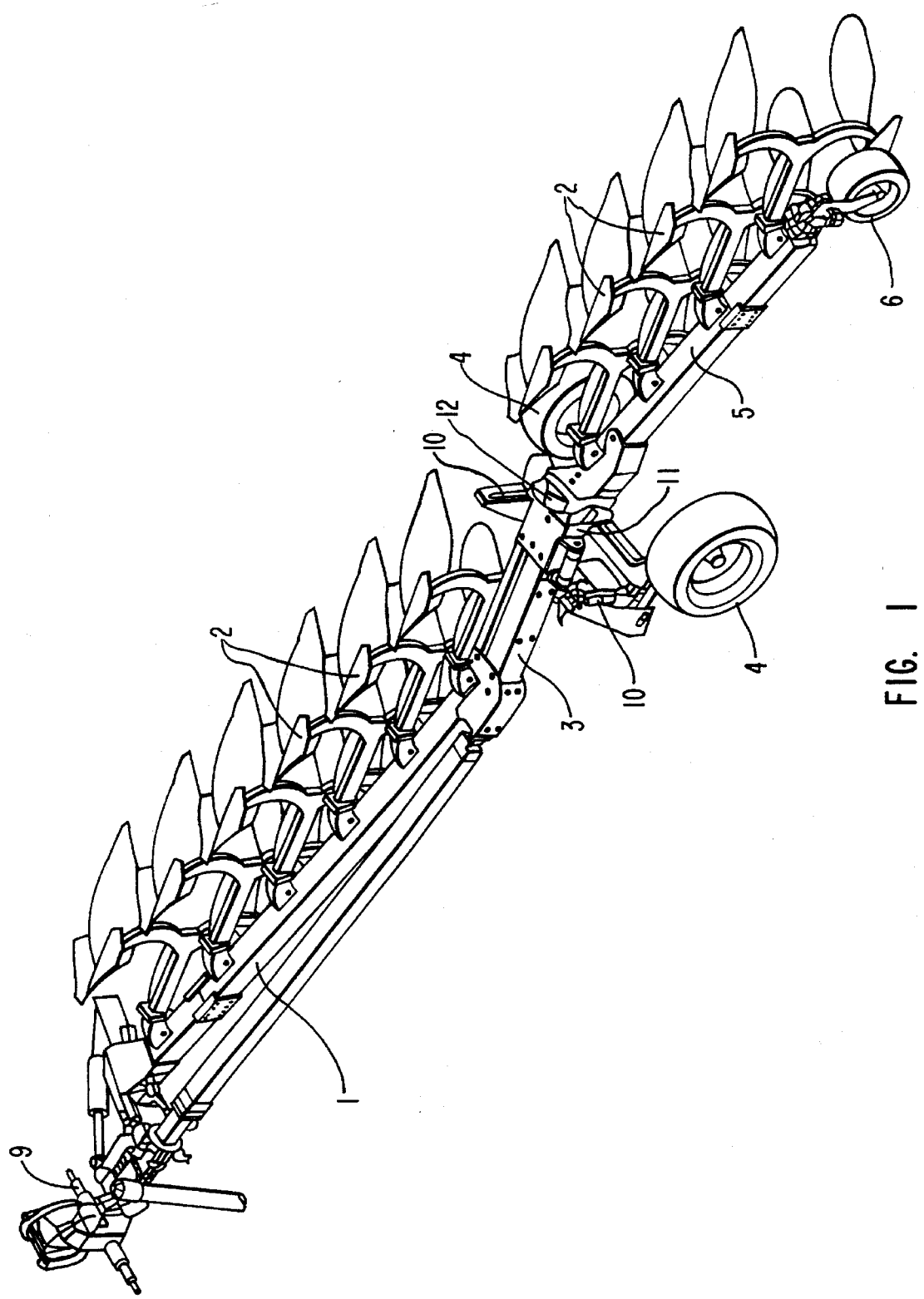
FIG. 1 is a perspective view of an embodiment of a semi-mounted reversible plough to which the invention may be applied and with the tractor omitted.
Figure 2:
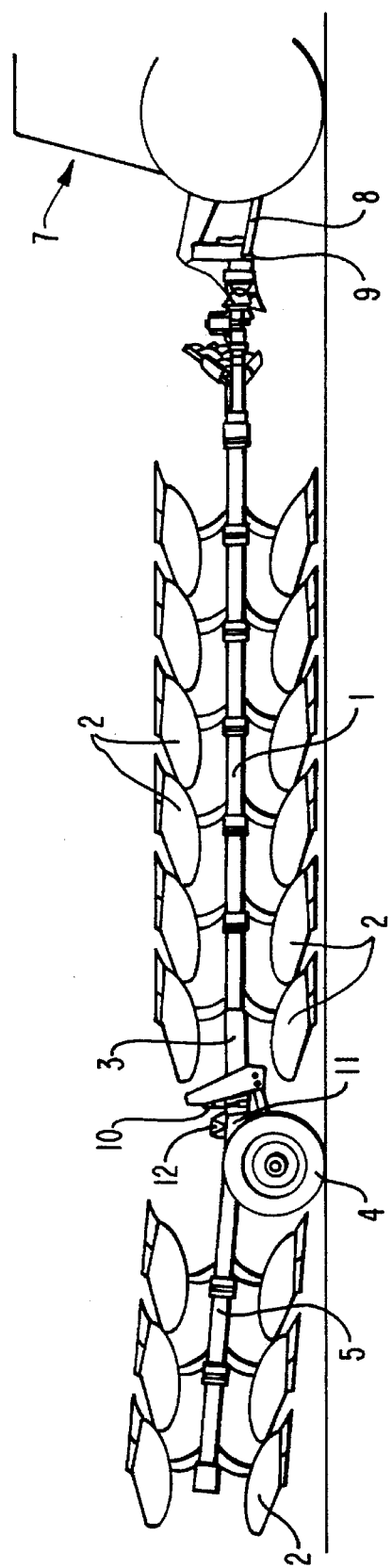
FIG. 2 is a side elevational view of the plough according to FIG. 1, with the rearmost depth wheel not being shown (however, a tractor has been shown partially)
Figure 3:
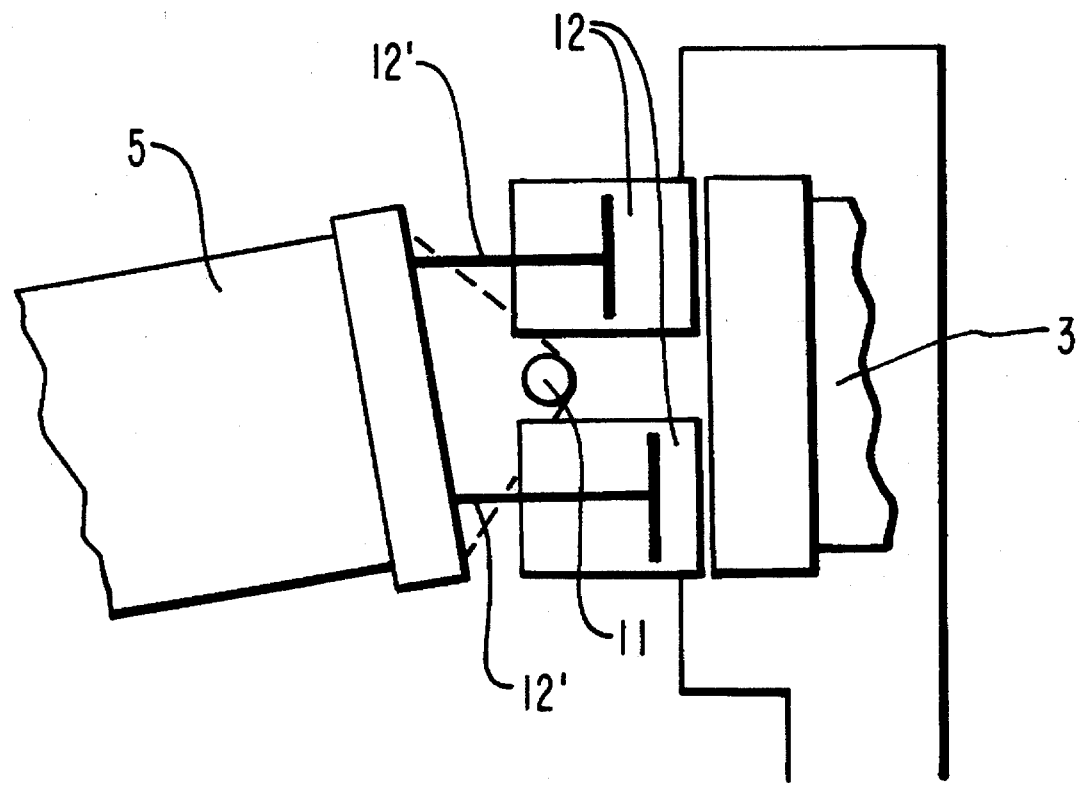
Figure 4:
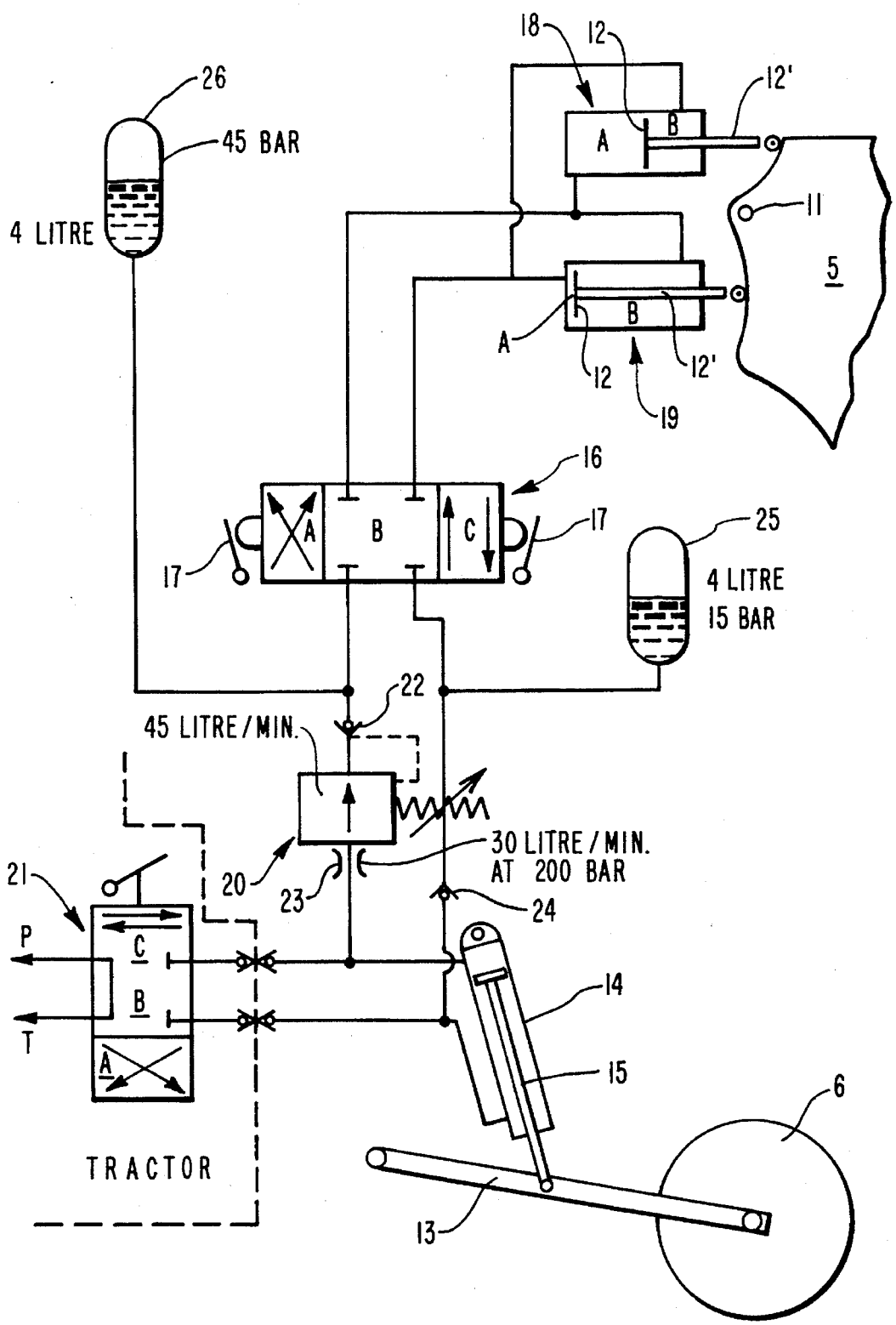

FIG. 3 shows part of a hydraulic circuit diagram of an assigned pressure fluid operated actuators (cylinders) for controlling the rear plough frame section at its articulated connection to the forward frame section (directly to the front plough frame section or indirectly via an intermediate frame section); and FIG. 4 is a schematic illustration of a hydraulic control circuit for controlling the ploughing depth of the plough bodies of a rear frame of a semi-mounted reversible plough according to the invention, and of the general type disclosed in FIGS. 1 to 3.

First, reference is made to FIGS. 1 and 2 of the drawings, with reference numeral 1 denoting a front plough frame section of a multi-share semi-mounted reversible plough comprising an elongated articulated plough frame of considerable longitudinal extent carrying a plurality of plough bodies 2.

Likewise, the elongate plough frame comprises an intermediate frame section 3 provided with wheels 4, as well as a rear plough frame section 5 rearmost carrying a so-called depth wheel 6 (not shown in FIG. 2).

At the foremost end thereof, the front plough frame section 1 is coupled to the rear of tractor 7 (FIG. 2) via pull bars 8 and drag shaft 9.

The wheels 4 of the intermediate section 3 may be raised and lowered by means of a pair of pressure fluid operated (hydraulic) cylinders 10. This set of wheels 4 are controlled by a manoeuvring valve (not shown) within the tractor 7.

As previously mentioned, the elongate plough frame is of an articulated construction, the articulation being effected by means of a horizontal pivot 11 supported by the intermediate frame section 3 (and extending generally perpendicular to the ploughing direction) and about which the rear plough frame section 5 may tilt up and down. Thus, whenever the plough takes a ploughing position, the rear plough frame section 5 may be raised and lowered.

The tilting of the rear plough frame section 5 is effected by means of two pressure fluid operated actuator means (such as hydraulic cylinders) 12—see FIG. 3, said actuator means 12 being controlled by means of a hydraulic control circuit according to the invention and as disclosed in FIG. 4.

As it appears from FIG. 3, the cylinder ends of the pressure fluid operated actuator means 12 have been attached to the intermediate frame section 3, the two actuator means 12 being positioned at either side of the tilting pivot 11 for the rear plough frame section 5, the piston rods 12' thereof being pivotally connected to the rear plough frame section 5.

FIG. 3 is a detail view showing part only of the hydraulic control circuit to control the attitude of the rear plough frame section 5 about horizontal pivot 11. In our UK patent application No 9203279.6 (publication No GB 2264216A), the actuators 12 can operate in a first mode to allow limited pivotal movement of the rear frame section and can operate in a second mode to prevent such pivotal movement. When they allow pivotal movement, the rear frame section can pivot about horizontal pivot 11 in order to follow undulations and unevennesses in the ground which is being ploughed.

The preferred embodiment of the invention disclosed herein utilises the hydraulic depth control circuit shown in FIG. 4, and which is applied to a semi-mounted reversible plough of the type described above with reference to FIGS. 1 to 3. This preferred embodiment is particularly useful to control the ploughing depth of the ploughing bodies carried by the rear frame section, and especially when the number of plough bodies on the rear frame section is reduced i.e. there are only a few plough bodies and/or during encountering heavy soil conditions. In these situations, there can be a tendency for the ploughing depth of the plough bodies carried by the rear frame section not to be as deep as is required.

The preferred embodiment of the invention therefore provides a means whereby the uppermost of the cylinders (at any instance for right or left handed ploughing) is arranged to press continuously against the rear frame section 5 i.e. downwardly about pivot 11 so that the plough bodies carried by the rear frame section can always be held in the required ploughing depth position. The force applied by the cylinders (actuator) must be sufficiently large that the rear frame section with the plough bodies is pressed downwardly to the required ploughing depth. However, this force should not be too large, and particularly not so large that there should be any tendency for the reaction force from the ground to tend to press the front end of the rear frame section upwardly.

The force which is applied by the actuator is therefore arranged to be made adjustable by any convenient manual or automatically operating device controlling the operation of the hydraulic control circuit shown in FIG. 4.

When manual control is satisfactory, this can be achieved by providing a regulator which can be adjusted manually by the driver of the tractor. Alternatively, the regulator can be connected to an adaptive electronic measurement and control system.

Despite the provision of this carefully controlled depth control force being applied by the actuator to the rear frame section, the plough is still capable of adjusting itself to undulations and unevennesses in the surface of the ground being ploughed, with the respective cylinder rods moving in and out to compensate automatically.

Referring now to FIG. 4 in detail, the rear frame section 5 is hinged to the rear of the intermediate frame section 3 via horizontal pivot 11, and actuator cylinders 18 and 19 control the attitude of the frame section 5 about pivot 11 via corresponding movement of the piston rods 12' connected to pistons 12 in the cylinders 18 and 19. A 4/3 way valve 16 controls the operation of the cylinders 18 and 19, depending upon which of the three positions shown (A, B, C) is taken up.

The valve 16 is mechanically operated by a toggle mechanism 17, and the arrangement is such that valve 16 can only be operated when the plough is either in the right hand ploughing position shown in FIG. 1, or the left hand ploughing position, and in addition when the toggle mechanism 17 is in its operating position.

The toggle mechanism 17 is arranged to be operated by the arm 13 which controls the depth of the depth control wheel 6, and toggle mechanism 17 is moved into its inoperative position by the wheel arm 13 only when the rear frame section 5 is in its highest position with the plough bodies out of the ground as shown in FIG. 2. However, the toggle mechanism 17 is moved into its operating position only when the rear frame section is in the lowest position.

The valve 16 is mounted on a part of the plough which carries out movement during turning i.e. during plough body reversal, and the position of the valve 16 is such that it can be operated by the toggle mechanism 17 on one side when the plough is in the left side ploughing position, and is operated by the toggle mechanism 17 on the other side when the plough is in the right side ploughing position.

A hydraulic accumulator 26 is provided in the hydraulic circuit to maintain hydraulic pressure in the system on the pressure side.

The pressure in the system is regulated by a pressure regulator 20, which can be adjusted manually by the driver of the tractor, or automatically by connecting the regulator 20 to an adaptive electronic measurement and control system. A check valve 22 is arranged between pressure regulator 20 and the control valve 16 to lock the pressure in the system, whereas a further check valve 24 ensures that the high pressure tractor system does not come into communication with the low pressure part of the system. An accumulator 25 acts as a reservoir for the varying amounts of oil in the system. A throttle valve 23 arranged adjacent to and upstream of the pressure regulator 20 ensures that the pressure regulator 20 does not shut-off the oil flow, if there should be any pressure surges when a tractor mounted valve 21 is opened.

Depth control wheel 6 mounted at the rear end of rear frame section 5 has its height controlled via wheel control arm 13 and connecting rod 15 of a control cylinder 14. Hydraulic pressure fluid is supplied to the system from the hydraulic pump P of the tractor, and controlled by the valve 21 and with return to tank T. The component parts of the hydraulic control system have now been described, and the mode of operation of the system will now be described below.

Ploughing operation

For the sake of explanation, it will be assumed that the plough has taken up the position for right side ploughing as shown in FIG. 1, and that the switching position C of the valve 16 is active because of the toggle mechanism 17. The accumulator 26, chamber A of cylinder 18 and chamber B of cylinder 19 are pressurised. The uppermost of the control rods 12' is pressed against the rear frame section 5 to ensure that the plough bodies carried by the rear frame section take-up the required ploughing depth position. The lowermost of the control rods 12' is correspondingly fully retracted.

However, the pressure in the system, and therefore the force of the actuator cylinders is controlled so as to be not large enough to hold the weight of the rear frame section, and neither is it able to withstand any substantial force generated by the depth control wheel 6. The rear frame section therefore has the plough bodies pressed into the ground surface with a sufficient force, and yet is able to follow undulations in the field surface. The rods 12' can therefore move in and out of the cylinders 18 and 19 to compensate for this movement of the rear frame section 5 about pivot 11, and the volume on both sides of the pistons 12 will ?. These variations are taken-up by the accumulators 25 and 26. Accumulator 25 is preloaded with a low pressure.

Lifting and turning operation

When the plough has come to the end of the furrow, and is going to be lifted out of the ground, the valve 21 is operated by the driver to the switching position C. The accumulator 25 then empties to the tank T, and the accumulator 26 becomes fully pressurised again. The piston rod 15 of cylinder 14 acts on wheel arm 13 and therefore moves the wheel 6 downwardly in order to raise the rear end of the rear frame section. In conjunction with the lifting movement of the intermediate frame section 3 by lowering of the wheels 4, this causes the plough bodies to be lifted out of the ground. However, at the same time the rear frame section tends to rotate downwardly about pivot 11, by its own weight and by the cylinder rod 12' following after and pressing out until the rear frame section stops against an abutment (not shown). When the plough is fully lifted, the toggle mechanism 17 comes out of its operating position, and the control valve 16 goes automatically to the mid position B. The oil volumes then held within the cylinders 18 and 19 are trapped, and the cylinders are locked in this position. The plough beams carrying the plough bodies are now rotated through 180° in order to carry out plough body reversal, and the rear end of the plough that was previously hanging down, when the turning started, is now sloping upwardly from the pivot 17 because what was the uppermost cylinder (18) is now the lowermost of the two cylinders (18, 19), and locked in this position as shown in FIG. 2.

Lowering

The plough can now be lowered into the ground again, which is done by switching the valve 21 so that the switching position A becomes active and the cylinder rod 12' is retracted. When the plough bodies are down again and the depth control wheel 6 is in the other end position, the toggle mechanism 17 is once again switched into operating position. The control valve 16 has also been turned together with the plough and it is the switching position A that is now made active. The plough has now returned to the starting position, with the difference that the plough is now in a left hand ploughing position and cylinder 19 is uppermost and has its control rod 12' which is uppermost and which is pressing against the rear frame section 5 above the pivot in order to press the rear frame section downwardly to maintain a required ploughing body depth.

Because of the toggle mechanism 17, it is possible to regulate the ploughing depth during the ploughing operation. The toggle mechanism 17 only switches the valve 16 when the plough is in the highest or in the lowest position, and the plough can therefore be regulated by the depth control wheels between these two positions without switching the valve The operation of the front frame section 1 and intermediate frame section 3 will now be described during lifting out of the end of a furrow, and plough body reversal, and subsequent reintroduction of the plough bodies into the ground during a reverse furrow.

When the plough comes to the end of the furrow, the drag shaft 9 is lifted, so that the plough front will become free of the soil. Thereafter, the intermediate section 3 is lifted by means of the actuators 10 via the wheels 4. Because of the pivot 11, the rear plough frame section 5 still occupies a correct ploughing depth by means of the depth wheel 6. However, when the intermediate frame section 3 has been lifted up sufficiently, the rear section will also be brought to a level above ground level.

All this happens within a smooth movement, adapted to the speed of ploughing, so that all plough bodies leave the ground when arriving at the end of the furrows 19.

As soon as the plough has been brought entirely above ground level and the wheels have taken their highest position, either by being brought to rest against mechanical stops or in that the cylinders 10 have reached their end positions, the hydraulic pressure within the circuitry becomes equal to the manoeuvring pressure of the tractor 7.

After the semi-mounted reversible plough has been reversed 180°, the rear plough frame section 5 will occupy an elevated (swung-up) position, such as shown in FIG. 2.

When the plough, after reversal, is to be put into the soil again, the movements take place in the opposite order. First, the pull bars 8 of the tractor 7 are lowered and then the intermediate frame section 3. Then, the rear plough frame section 5 will be lowered such that it, once more, takes a correct ploughing position.

These operations are also adapted to the speed of ploughing so that all plough bodies are run into the soil successively, i.e. at an imaginary line extending laterally at the end of the furrows.

When the entire plough takes the ploughing position, the rear plough frame section 5 may, once more, tilt about pivot 11 to follow the contour of the ground, but with a controlled biasing force urging the rear frame section 5 downwardly about the pivot to maintain a required ploughing body depth of the plough bodies carried by the rear frame section.

The drag shaft 9, the intermediate wheels 4 and the depth wheel 6 determined the ploughing depth.

I claim:

1. A multi-share reversible plough comprising:
   a. an elongate plough frame, said plough frame comprising:
      (i) a forward frame section having a rear end and being capable of being connected at a leading end thereof to the rear of a towing vehicle; and
      (ii) a rear frame section having a forward end pivotally connected to said rear end of said forward frame section so as to be capable of engaging in pivoting movement upwardly and downwardly relative to said forward frame section about a transverse pivot axis, thereby to follow unevenness in the surface of the ground being ploughed;
   b. a plurality of plough bodies mounted on each of said forward frame section and said rear frame section;

c. means for reversing said forward frame section and said rear frame section, thereby causing rotation of said plough bodies to take up either a first ploughing position or a second ploughing position;

d. a hydraulically operated actuator operatively coupled to said rear frame section, said actuator being capable of urging said rear frame section pivotally downward about said pivot axis, thereby to maintain said plough bodies mounted on said rear frame section at a required ploughing depth, said actuator comprising two cylinders, each of said cylinders being capable of alternating between a position above said pivot axis and a position below said pivot axis; and e. a hydraulic control circuit connected to said actuator, said control circuit comprising:

(i) a control valve to control the actuation of said cylinders of said actuator, said control valve being mounted on a movable part of said frame;

(ii) a toggle linkage which operates said control valve only when the plough has been fully adjusted to either said first ploughing position or said second ploughing position; and (iii) a pressure regulator to control the hydraulic pressure supplied to said actuator, thereby applying a controlled biasing force to said rear frame section sufficient to maintain said plough bodies mounted on said rear frame section at said required ploughing depth, said biasing force being able to be overcome to allow said pivoting movement of said rear frame section, thereby causing said plough bodies mounted thereon to follow the contour of the ground being ploughed.

2. A plough according to claim 1, wherein said plough is a semi-mountable reversible plough.

3. A plough according to claim 2, wherein said rear frame section is connected indirectly to said forward frame section by a short intermediate frame section which forms a rearward prolongation of said forward frame section.

4. A plough according to claim 1, further comprising:

a. an intermediate plough frame section having a forward end and a rear end, said intermediate plough frame section being connected at said forward end thereof to said rear end of said forward frame section, said intermediate plough frame section being connected at said rear end thereof to said front end of said rear frame section; and b. a respective pivotal connection at said front end and said rear end of said intermediate plough frame section, said pivotal connections each comprising an upright pivot about which relative generally horizontal lateral pivotal movement can take place during reversal of the plough body.

5. A plough according to claim 1, further comprising a 4/3 way control valve to control the routing of pressurized fluid to said cylinders of said actuator, said control valve in a first mode thereof actuating a first of said cylinders, in a second mode thereof actuating a second of said cylinder, and in a third mode thereof blocking supply of said pressure fluid to or from said cylinders.

6. A plough according to claim 1, further comprising:

a. a control arm coupled with said toggle linkage; and b. a depth control wheel for the rear frame section mounted on said control arm, said depth control wheel being capable of being adjusted to either said first ploughing position or said second ploughing position, thereby triggering an operative state in said toggle linkage.

7. A plough according to claim 1, wherein said hydraulic control circuit comprises an accumulator capable of applying a resilient force to said cylinder.

8. A plough according to claim 1, wherein said hydraulic control circuit comprises a plurality of accumulators capable of applying a resilient force to said cylinder.

9. A multi-share reversible plough comprising:

a. an elongate plough frame, said plough frame comprising:

(i) a forward frame section having a rear end and being capable of being connected at a leading end thereof to the rear of a towing vehicle; and (ii) a rear frame section having a forward end pivotally connected to said rear end of said forward frame section so as to be capable of engaging in pivoting movement upwardly and downwardly relative to said forward frame section about a transverse pivot axis, thereby to follow unevenness in the surface of the ground being ploughed;

b. a plurality of plough bodies mounted on each of said forward frame section and said rear frame section;

c. means for reversing the forward frame section and said rear frame section, thereby causing rotation of said plough bodies to take up either a first ploughing position or a second ploughing position;

d. a hydraulically operated actuator operatively coupled to said rear frame section, said actuator being capable of urging said rear frame section pivotally downward about said pivot axis, thereby to maintain said plough bodies mounted on said rear frame section at a required ploughing depth; and e. a hydraulic control circuit connected to said actuator, said control circuit comprising:

(i) a control valve to control the actuation of said actuator, said control valve being mounted on a movable part of said frame; and (ii) a toggle linkage which operates said control valve only when the plough has been fully adjusted to either said first ploughing position or said second ploughing position; and (iii) a pressure regulator to control the hydraulic pressure supplied to said actuator, thereby applying a controlled biasing force to said rear frame section sufficient to maintain said plough bodies mounted on said rear frame section at said required ploughing depth, said biasing force being able to be overcome to allow said pivoting movement of the said rear frame section, thereby causing said plough bodies mounted thereon to follow the contour of the ground being ploughed.

10. A plough according to claim 9, wherein said actuator comprised two cylinders actuatable by said control valve, one of said cylinders being positioned above said pivot axis, and the other of said cylinders being positioned below said pivot axis.

11. A plough according to claim 10, wherein said hydraulic control circuit comprises an accumulator capable of applying a resilient force to said cylinders.

12. A plough according to claim 10, wherein said cylinders have a mid-position, thereby allowing said forward frame section and said rear frame section to rotate approximately 180°.

13. A plough according to claim 9, wherein said plough is a semi-mountable reversible plough.

14. A plough according to claim 13, wherein said rear frame section is connected indirectly to said forward frame section by a short intermediate frame section, thereby forming a rearward prolongation of said forward frame section.

15. A plough according to claim 9, further comprising:
   a. an intermediate plough frame section having a forward end and a rear end, said intermediate plough frame section being connected at said forward end thereof to said rear end of said forward frame section, said intermediate plough frame section being connected at said rear end thereof to said front end of said rear frame section; and
   b. a respective pivotal connection at said front end and said rear end of said intermediate plough frame section, said pivotal connections each comprising an upright pivot, thereby allowing generally horizontal lateral pivotal movement about said upright pivot during reversal of the plough body.

16. A plough according to claim 15, further comprising:
   a. a control arm coupled with said toggle linkage; and
   b. a depth control wheel for the rear frame section mounted on said control arm, said depth contest wheel being capable of being adjusted to either of said first ploughing position of said second ploughing position, thereby triggering an operative state in said toggle linkage.

17. A multi-share reversible plough comprising:
   a. an elongate plough frame, said plough frame comprising:
      (i) a forward frame section having a rear end and being capable of being connected at a leading end thereof to the rear of a towing vehicle; and
      (ii) a rear frame section having a forward end pivotally connected to said rear end of said forward frame section so as to be capable of engaging in pivoting movement upwardly and downwardly relative to said forward frame section about a transverse pivot axis, thereby to follow unevenness in the surface of the ground being ploughed;
   b. a plurality of plough bodies mounted on each of said forward frame section and said rear frame section;
   c. means for reversing the forward frame section and said rear frame section, thereby causing rotation of said plough bodies to take up either a first ploughing position or a second ploughing position;
   d. a hydraulically operated actuator operatively coupled to said rear frame section, said actuator being capable of urging said rear frame section pivotally downward about said pivot axis, thereby to maintain said plough bodies mounted on said rear frame section at a required ploughing depth, said actuator comprising two cylinders, each of said cylinders being capable of alternating between a position above said pivot axis and a position below said pivot axis; and
   e. an hydraulic control circuit connected to said actuator, said control circuit comprising a pressure regulator to control the hydraulic pressure supplied to said actuator, thereby applying a controlled biasing force to said rear frame section sufficient to maintain said plough bodies mounted on said rear frame section at said required ploughing depth, said biasing force being able to be overcome to allow said pivoting movement of the said rear frame section, thereby causing said plough bodies mounted thereon to follow the contour of the ground being ploughed.

18. A plough according to claim 17, further comprises:
   a. a control valve to control the actuation of said cylinders of said actuator, said control valve being mounted on a movable part of said frame; and
   b. a toggle linkage which operates the control valve only when the plough has been fully adjusted to either one of said two ploughing positions.

19. A plough according to claim 17, wherein said hydraulic control circuit comprises an accumulator capable of applying a resilient force to said cylinder.

20. A plough according to claim 17, further comprising:
   a. a control arm coupled with said toggle linkage; and
   b. a depth control wheel for the rear frame section mounted on said control arm, said depth contest wheel being capable of being adjusted to either of said first ploughing position of said second ploughing position, thereby triggering an operative state in said toggle linkage.

* * * * *

UNITED STATES PATENT AND TRADEMARK OFFICE
CERTIFICATE OF CORRECTION

PATENT NO. : 5,603,381
DATED : February 18, 1997
INVENTOR(S) : Tor Torgrimsen

It is certified that error appears in the above-identified patent and that said Letters Patent is hereby corrected as shown below:

Column 5, line 49, "pivot 17" should be -- pivot 11 --

Column 5, line 65, "pivot in" should be -- pivot 11 in --

Column 6, line 7, "valve" should be -- valve 16. --

Signed and Sealed this

Fourteenth Day of October, 1997

*Attest:*

BRUCE LEHMAN

*Attesting Officer*     *Commissioner of Patents and Trademarks*